(12) United States Patent
Chien et al.

(10) Patent No.: US 6,262,203 B1
(45) Date of Patent: *Jul. 17, 2001

(54) ELASTOMERIC POLYPROPYLENE AND OTHER POLYOLEFIN ELASTOMERS, METALLOCENE CATALYST AND METHOD OF ION PREPARATION

(75) Inventors: James C. W. Chien; Marvin D. Rausch, both of Amherst, MA (US)

(73) Assignee: The Academy of Applied Science, Concord, NH (US); a part interest ( * ) Notice: Subject to any disclaimer, the term of this patent is extended or adjusted under 35 U.S.C. 154(b) by 0 days.

This patent is subject to a terminal disclaimer.

(21) Appl. No.: 09/239,707

(22) Filed: May 13, 1998

Related U.S. Application Data

(62) Division of application No. 08/383,549, filed on Feb. 3, 1995, now Pat. No. 5,756,614, which is a continuation of application No. 08/091,414, filed on Jul. 15, 1993, now abandoned, which is a continuation of application No. 07/483,239, filed on Feb. 22, 1990, now abandoned.

(51) Int. Cl.$^7$ .............................. C08F 4/64; C08F 4/642; C08F 10/06
(52) U.S. Cl. .......................... 526/160; 526/351; 526/943
(58) Field of Search ................................... 526/160, 351, 526/943

(56) References Cited

U.S. PATENT DOCUMENTS

| | | | | |
|---|---|---|---|---|
| 3,175,999 | * | 3/1965 | Natta et al. | 260/93.7 |
| 3,784,502 | * | 1/1974 | Gobran et al. | 260/33.06 |
| 4,522,982 | * | 6/1985 | Ewen | 525/240 |
| 4,849,487 | * | 7/1989 | Kaminsky et al. | 526/160 |
| 5,594,080 | * | 1/1997 | Waymouth et al. | 526/126 |
| 5,969,070 | * | 10/1999 | Waymouth et al. | 526/351 |

* cited by examiner

*Primary Examiner*—David W. Wu
*Assistant Examiner*—R. Rabago
(74) *Attorney, Agent, or Firm*—Rines and Rines

(57) ABSTRACT

Disclosed are a thermoplastic elastomeric polypropylene (and other olefin homopolymerized polymers) made using a metallocene catalyst and a single olefin monomer, and a method of preparing the same to produce a chain of alternating stereo regular crystallizable segments and stereo-irregular non-crystallizable polymerized segments, the former acting as physical crosslinks between tee non-crystallizable segments to form a thermoplastic elastomeric material having good elastomeric properties.

19 Claims, No Drawings

ELASTOMERIC POLYPROPYLENE AND OTHER POLYOLEFIN ELASTOMERS, METALLOCENE CATALYST AND METHOD OF ION PREPARATION

This application is a division of application Ser. No. 08/383,549, filed Feb. 3, 1995, now U.S. Pat. No. 5,756,614, which is a continuation of application Ser. No. 08/091,414; filed Jul. 15, 1993 (abandoned), which is a continuation of application Ser. No. 07/483,239, filed Feb. 22, 1990 (abandoned).

The present invention relates to thermoplastic elastomers such as polypropylene and related polyolefin types, being more specifically concerned with polypropylenes exhibiting elastomeric properties and catalysts for making the same.

BACKGROUND

Tullock and co-workers, (Tullock, C. W.; Tebbe, F. N.; Mulhaupt, R.; Ovenall, D, W.; Saltarquist, R. A.; Ittel, S. D. *J. Polym. Sci. Part A* (1989) 27 3063; Collette, J. W.; Tullock, C. W.; MacDonald, R. N.; Buck, W. H.; Su. A. C. L.; Harrell, J. R.; Mulhaupt, R.; Anderson, B. C. *Macromolecules* (1989) 22 2851), have obtained polypropylenes exhibiting elastomeric properties using alumina-supported bis(arene) Ti, Zr, and Hf catalysts with materials of heterogeneous composition comprising chains soluble in ethyl ether, hexane, heptane and octane, as well as octane-insoluble ones. Each fraction contains polypropylene chains considered to be uniform in structure. The total polymer exhibits poor elastomeric properties. Hysterisis effects showing 110% permanent set after 300% elongation were obtained.

Ewen et al. and Kaminsky et al.

(Ewen, J. A. *J. Am. Chem. Soc.* 1984 106, 6355.; Ewen, J. A. "Ligand Effects on Metallocene Catalyzed Polymerizations", in Catalytic Polymerization of Olefins; Keii, T.; Soga, K., Eds.; Elsevier, New York, 1986, p. 271; (c) Ewen, J. A.; Haspeslagh, L.; Atwood, J. L.; Zhang, H. *J. Am. Chem. Soc.* 1987 109 6544; Kaminsky, W.; Kuiper, K.; Brintzinger, H. H.; Wild, F. R. W. P. *Angew. Chem. Int. Ed. Engl.* 1985-24 507), described symmetrical ansa-metallocene compounds which also produce heterogenous mixture of polypropylenes; examples are rac-ethylene bis(indenyl) zirconium dichloride and rac-ethylene bis (tetrahydroindenyl) zirconium dichloride. We have discovered new nonsymmetric ansa-metellocene systems, exemplified by rac-ethylidene $(1-\eta^5-$tetramethylcyclopentadienyl) $(1-\eta^5$-indenyl)-dichlorotitanium (1) which produces homogeneous homopolypropylene having the attributes of a thermoplastic elastomeric (TPE) material, which properties are derived from intrinsic molecular characteristics of the macromolecular chain, and, unlike the hecerogenotis polymers of Tullock et al, which have poor elastomeric properties resulting from the blend of amorphous and stereo regular polypropylenes.

OBJECT OF THE INVENTION

A principal object of this invention, accordingly, is to provide a new thermoplastic elastomeric material of the olefin class and one that can be produced with a single monomer and a novel method of producing the same.

A further object is to provide a novel thermoplastic elastomeric polypropylene material.

Still a further object is to provide new catalysts for forming such novel products.

Other and further objects will be explained hereinafter and are more particularly delineated in the appended claims.

SUMMARY

In summary, however, from one of its important aspects, the invention embraces a novel catalytic new composition of matter of formula rac-ethylidene $(1-\eta^5$terramethylcyclopencadienyl) $(1-\eta^5$-indenyl) dichloro-M, where M is a metal selected from the group consisting of Ti, Zr and Hf. The invention also involves novel thermoplastic elastomeric olefin products including a thermoplastic elastomeric olefin polymer having alternate blocks of homopolymerized stereo regular crystallizable segments and of homopolymerized stereo irregular non-crystallizable amorphous segments, the former segment aggregating into crystalline domains to act as physical crosslinks, thus enabling elastic recovery of stretched specimens upon release of the strain. Preferred and best mode embodiments, formations and method for carrying out the same are hereinafter set forth in detail.

Turning first to the method of forming the novel catalyst and single olefin thermoplastic elastomeric products of the invention, a reaction between 1,2,3,4,5-pentamethylfulvene[6] and indenyllithium was produced in the THF solution, followed by hydrolysis and distillation, affording 1-(1-indenyl)-1-(2, 3, 4, 5-tetramethylcyclepentadienyl) ethane ( <u>2</u>) (b.p. 130–140° C./0.1 terr) in 54% yield [Anal. (calcd.): C, 90.63% (90.85%); H, 9.25% (9.15%)]. The golden orange oil <u>2</u> is an isomeric mixture according to $^1$H and $^{13}$C NMR. A solution of <u>2</u> (13 mmol) in 150 mL THF was cooled to 0° C., n-butyllithium (26 mmol) was added dropwise and stirred for several h at 40° C. to form a deep red solution. It was cooled to −78° C. and 13 mmol of $TiCl_4(THF)_2$ in TUF was added dropwise. Subsequent refluxing for 18 h gave a green solution. Removal of the solvent, extraction with $CH_2Cl_2$, filtration, and removal of this $CH_2Cl_2$ gave 4.7 g of <u>1</u> in 95% crude yield. The product was purified by crystallization from $CH_2Cl_2$/n-hexane, MS m/e 381 for M+; [Anal. (calcd.): C, 61.41% (63.02%); H, 5.70% (5.82%)]. The $^1$H and $^{13}$C-NMR spectra indicate that only one of the two possible diasteromeric pairs is isolated, with the probable structure shown based on steric considerations.

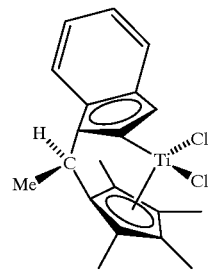

The above formula can be expressed as rac-ethylidene $(1-\eta^5$-tetramethylclopentadienyl) $(1-\eta^5$-indenyl) dichlorotitanium. As will later be explained the titanium may be replaced by other group 4 metals.

The novel catalyst (1, M=Ti) thus prepared was then used to catalyze the polypropylene product of the invention as follows:

Polymerization of polypropylene at 1.5 atm and 30° C. with 27 μM of <u>1</u> and 54 mM of $MAO^9$ based on Al for 1 h have 0.74 g of polypropylene (3) which corresponds to a catalytic activity of $2.5 \times 10^5$ g PP/(mol Ti.h-atm). Polymerization at 25° C. also yielded polypropylene (4). Polymers 3 and 4 were subjected to solvent fractionation.[10] Aside from a very small amount of acetone soluble material, the polymers are completely soluble in refluxing ethyl ether indicating uniformity of structure. They are also characterized by narrow molecular weight distribution. According to GPC using columns calibrated with polypropylene of known $\overline{M}_n$ $\overline{M}_w$, 3 has $\overline{M}_n$=66,600, $\overline{M}_w$=127,000 and $\overline{M}_w/\overline{M}_n$=1.9 and 4 has $\overline{M}_n$=98,400, $\overline{M}_w$=164,000 and $\overline{M}_w/\overline{M}_n$=1.7. The degree of crystallinity was found by Roland analysis of x-ray powder patterns obtained on samples annealed between 30° and 45° C. to be 28.6±0.5% and 26.5±0.4% for 3 and 4, respectively. The polymers exhibit more than one melting endotherm; the transition temperature ($T_m$) and enthalpy ($\Delta H_f$) obtained by DSC on samples annealed at 30° C. for 12 h are given in Table 1. Annealing at lower temperatures resulted in lower $T_m$, which indicates a dependence of the size and order of crystalline domains on crystalline conditions.

The dynamic storage modulus (G') measured at 1 rad $S^{-1}$ as a function of temperature showed three orders of magnitude decrease between 60 and 80° C. due to the melting transitions. G' increases only slightly with frequency at 50° C. but increases strongly with frequency at 100° C., indicating an elastomeric state in the former but a single phase melt state in the latter. Stress-strain curves obtained on dogbone samples (molded at 100° C., annealed at 60° C. for 2 h) showed very strong mechanical properties (Table I). In particular, 4 did not break until stretched beyond 1260%. The polymers exhibit excellent elastic recoveries (Table II); the strain recovery is better than 90% for 4 after elongation of 100–300%. These properties can be explained only by the presence of by physical cross-links due to crystallization of stereoregular segments of the polypropylene chains. The molecular weight between crosslinks ($\overline{M}_c$) was estimated from the equilibrium modulus ($G_m$), which was measured at 50° C., 0.5% strain, and stress relaxed for $10^4$ s (Table I). The estimates for $\overline{M}_c$ [=(density) $RT/G_m$] are $2.0\times10^3$ and $4.4\times10^3$ for 3 and 4, respectively. Since the crystallizable segments in the polymer chains must be quite short as indicated by the low $T_m$, there are many alternating crystallizable and noncrystallizable segments, of the order of 20. These polymers contain low homosteric pentad populations.

For syndiospecific propylene polymerization using (isopropylidenecyclopentadienyl-1-fluorenyl) dichlorohafnium, there is chain migration following each monomer insertion. The bridging carbon in 1 is chiral and can have the polymer chain either <u>syn</u> ( 1a) or <u>anti</u> ( 1b) to the <u>ansa</u>-methyl group during polymerization.

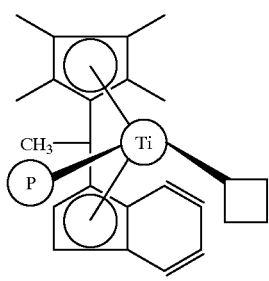

1a

-continued

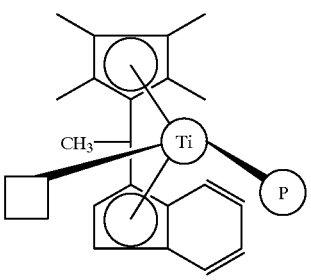

1b

The block or segment structure of the present TPE polypropylene may be explained by postulating that during chain propagation on 1a and 1b they undergo occasional interconversion.

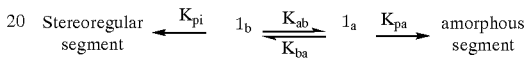

where $k_p$'s are greater than $k_{ab}$ and $k_{ba}$. The resulting polymer is microphase separated into crystalline and amorphous domains, and the former act as physical crosslinks. Above $T_m$, the polymers become linear viscoelastic-capable of being extruded, molded or otherwise processed like thermoplastics.

The above results demonstrate that the novel catalyst 1 can produce polypropylene chains containing alternating crystallizable and non-crystallizable segments in any given chain. The polymers are quite homogeneous in structure as well as MW. This is believed to be the first example of a thermoplastic elastomer comprised of a single monomer.

TABLE I

Mechanical and thermal properties of TPE polypropylenes

| Sample | 3 | 4 |
|---|---|---|
| Strength, MPa | 3.97 | 12.1 |
| Strain to break, % | 525 | 1260 |
| Recovery after break, % | 86 | 94 |
| $G_{eq}$, MPa | 1.47 | 0.56 |
| $T_m^a$, ° C. | 51.2, 66.0 | 53.1, 63.8 |
| $\Delta H_f^a$, cal g$^{-1}$ | 3.26 | 2.93 |

[a]Samples annealed at 30° C. for 12 h before DSC scan.

TABLE II

Elastomeric properties of TPE polypropylenes

| Sample | 3 | | | 4 | | |
|---|---|---|---|---|---|---|
| Strain, % | 100 | 200 | 300 | 100 | 200 | 300 |
| Stress, MPa | 3.13 | 3.39 | 3.53 | 3.07 | 3.30 | 3.59 |
| Recovery, % | 93 | 91 | 83 | 97 | 96 | 92 |

While the catalyst above described (1) uses Ti, as before pointed out, Zr and Hf (group 4 metals) are also useful therein. In all such instances, in one quadrant of the paths <u>ansa</u>-metallocene complex the monomer inserts into the growing chain in a stereo-regular fashion to produce crystallizable (isotatic) segments or blocks; whereas when the chain migrates into the other quadrant of the <u>ansa</u>-metallocene complex characterized by reduced stereoselectivity and polymerization growth is stereochemically irregular into amorphous (atactic) segments in blocks which cannot be crystallized, such that the elastomeric blocks are held between the solid crystallized segments or blocks and enable the snapping back when elongated or stretched. The growth occurs first for a while in the stereo-selective mode, and then in the stereo-nonselective mode, with the resulting chain containing, as before stated, about twenty such alternating segments or blocks in the homopolymerized product.

Though above-described in connection with polypropylene ($CH_2=CH_3$, repeated), other olefin monomers may also similarly be rendered into thermoplastic elastomers with the catalysts of the invention, including 4-methyl-hexene, 4-methyl-heptene and 3-methyl-pentene.

Further modifications will occur to those skilled in the art, and all such as considered to fall within the spirit and scope of the invention as defined in the appended claims.

What is claimed is:

1. A method of forming thermoplastic elastomeric propylene polymer, that comprises, in the presence of MAO, homopolymerizing a monomer of propylene with a metallocene propylene polymerization catalyst of metals selected from the group consisting of Ti, Zr and Hf, that can cause polymerization along two propagation paths, wherein one propagation path causes homopolymerization of the propylene stereoselectively into crystallizable blocks in the resulting chain, and the other polymerization path creates irregular non-crystallizable amorphous blocks, the catalyst enabling interconversions along the two paths during the polymerization and creation of the chain, whereby the propylene is polymerized with alternating stereo-regular crystallizable polymerized blocks and stereo-irregular non-crystallizable polymerized blocks, with the former held between the non-crystallizable blocks to enable elastic recovery when stretched and released.

2. A method as claimed in claim 1 and in which the metallocene has a component of indenyl dichloro-M, where M is selected from the group consisting of Ti, Zr and Hf.

3. A method as claimed in claim 1 and in which the metallocene has components of haptoligands based on cyclopentadienyl, indenyl, and fluorenyl derivatives.

4. A method as claimed in claim 3 and in which each of the crystallizable and non-crystallizable blocks contains of the order of twenty monomer units.

5. A method as claimed in claim 1 and in which the crystallizable polymerized blocks provide physical isotactic block crosslinks between the non-crystallizable atactic blocks which impart elastomeric properties with a range of recovery from substantially 93–97% after 100% elongation strain.

6. A method as claimed in claim 5 and in which the X-ray measured crystallinity is in a range of substantially 26.5 to 28.6%.

7. A thermoplastic elastomeric propylene polymer chain having alternate blocks of a homopolymerized single propylene monomer that contains alternating stereo-regular crystallizable isotactic polymerized blocks and stereo-irregular non-crystallizable atactic polymerized blocks, formed by the method of claim 1.

8. A thermoplastic elastomeric propylene polymer chain having only alternate blocks of a homopolymerized single propylene monomer that contains alternating stereo-regular crystallizable isotactic polymerized blocks and stereo-irregular non-crystallizable atactic polymerized blocks, formed by the method of claim 5.

9. A method of forming thermoplastic elastomeric polypropylene, that comprises, homopolymerizing a monomer of propylene with a metallocene/aluminoxane propylene polymerization catalyst of metals selected from the group consisting of Ti, Zr and Hf to form stereoblock polypropylene having a structure of alternating isotactic/atactic chain sequences.

10. A method of forming thermoplastic elastomeric alpha-olefin polymers, that comprises, polymerizing an alpha-olefin monomer with a metallocene/aluminoxane alpha-olefin polymerization catalyst of metals selected from the group consisting of Ti, Zr and Hf to form stereoblock structures of alternating isotactic/atactic chain sequences.

11. A metallocene/aluminoxane catalyzed thermoplastic elastomeric propylene polymer chain structure having alternating isotactic/atactic block sequences.

12. The polymer of claim 11 wherein the polymer melting temperature is above 50° C.

13. The polymer of claim 11 wherein the polymer molecular weight distribution is about 2.

14. The polymer of claim 11 wherein the molecular weight $M_n$ is above about 60,000.

15. The polymer of claim 14 wherein the molecular weight $M_n$ is from about 60,000 to about 100,000.

16. The polymer of claim 11 wherein, after elongation of 100%, the recovery of the polymer is about 93–97%.

17. The polymer of claim 11 wherein the polymer is elastomeric in exhibiting a positive power for recovery from elongation at strain above about 100%.

18. The polymer of claim 11 wherein the degree of crystallinity as measured by X-ray is about 26.5, corresponding to an m m m m content in excess of about 10%.

19. The polymer of claim 18 wherein the crystallinity extends to about 28.6%, corresponding to an m m m m content of about 30%.

\* \* \* \* \*